United States Patent [19]

Yoshioka et al.

[11] Patent Number: 5,050,165
[45] Date of Patent: Sep. 17, 1991

[54] BRIDGE CIRCUIT FOR INTERCONNECTING NETWORKS

[75] Inventors: Ryuichi Yoshioka; Ikuo Furuya, both of Tokyo, Japan

[73] Assignee: Seiko Instruments Inc., Japan

[21] Appl. No.: 359,568

[22] Filed: Jun. 1, 1989

[51] Int. Cl.[5] .............................................. H04J 3/02
[52] U.S. Cl. ............................................... 370/85.13
[58] Field of Search .................. 370/85.9, 85.13, 85.14, 370/94.3, 94.1

[56] References Cited

U.S. PATENT DOCUMENTS

| | | | |
|---|---|---|---|
| 4,577,313 | 3/1986 | Sy | 370/85.14 |
| 4,627,052 | 12/1986 | Hoare et al. | 370/85.13 |
| 4,715,030 | 12/1987 | Koch et al. | 370/85.13 |
| 4,737,953 | 3/1988 | Koch et al. | 370/85.13 |

Primary Examiner—Douglas W. Olms
Assistant Examiner—Wellington Chin
Attorney, Agent, or Firm—Bruce L. Adams; Van C. Wilks

[57] ABSTRACT

A bridge circuit is provided for connecting at least two networks. The addresses of sending and receiving stations in a message received from a network are subjected to cyclic redundancy checking (CRC), and the results of CRC of the source are used as the memory addresses for storing the address information of the sending stations in the network. When a message is received, the message receiving operation is continued or stoped in accordance with the content of the memory read from the results of the CRC of the destination address. Using CRC codes frees a microprocesor in the bridge circuit from processing the storing, retrieval, comparison and judgement of the addresses of the sending and receiving stations, thereby increasing the message transferring speed between the networks.

17 Claims, 6 Drawing Sheets

BRIDGE CIRCUIT FOR INTERCONNECTING NETWORKS

BACKGROUND OF THE INVENTION

1. Field of the Invention

The present invention relates to a bridge circuit for interconnecting networks for storing information of the addresses of stations in a local area network which send and receive a message, effectively connecting two local area networks with each other.

2. Description of the Prior Art

A conventional bridge circuit for interconnecting networks with each other, is the subject of U.S. Pat. No. 4,597,078 assigned to Digital Equipment Corporation. The bridge circuit is dealing with two local networks. There is connected to a first local network a first control device and to a second local network a second control device. When a message is sent from the first local network to its associated control device, the message is examined and if it is acceptable for further transmission, the control device sends an interrupt signal to a microprocessor. Meantime the message has been stored in a RAM. In response to the interrupt signal, the microprocessor is aware of which network has sent the message and fetches the destination address of the message from the RAM to a look-up controller circuit. The look-up controller circuit is designed to take the destination address information and compares it against a group of destination addresses which are held in a look-up RAM. The destination address information, in the look-up RAM, includes a tag which indicates whether the destination address belongs to a station in the first or second local network. If there is a match between the destination address of the message and a destination address in the look-up RAM, the microprocessor will send the message to the proper station through the bridge, or ignore the message if the sending station is on the same local network as the receiving station. If there is no match, i.e., it represents a new station, the message will be sent to the other network. In the latter case when such a new station becomes a source station, its address will be recorded so that the next time such a station is a destination.

In the above-described bridge circuit, the microprocessor stores the addresses of the sending and receiving stations in the memory, creates a table of the addresses of the stations corresponding to each network, retrieves the addresses in the table, and judges whether the message is to be sent to the other network or not. As the result, the transferring speed of a message is restricted not by the physical speed of the networks but by the processing speed of the microprocessor in the bridge circuit.

SUMMARY OF THE INVENTION

An object and advantage of the present invention is to provide a novel bridge circuit for interconnecting networks which increases the transferring speed of a message between the networks.

Another object of the present invention is to provide a novel bridge circuit for interconnecting networks in which a microprocessor processes an operation of sending a receiving message from on network to the other network but does not process operations such as the storing of the address of the sending station and the receiving station, the retrieving of the address, and judging whether the receiving message is to be sent to the other network or not.

A further object of the present invention is to provide a novel bridge circuit for interconnecting networks in which a microprocessor judges whether a message receiving operation is continued or stopped in accordance with the address of the receiving station.

In order to accomplish the above-described objects, according to the present invention, in place of the processings of the microprocessor such as the storing, retrieval, comparison and judgement of the source address and destination address, the addresses are subject to CRC. When a message is received from one network, the results of the CRC of the source address are written into a memory by bits as the addresses information during the message receiving operation, whereby the sending stations in the network from which the message has been received by the bridge circuit are stored. The bits of the memory are read while using the results of the CRC of the destination address, and from the content of the thus-read bits, whether or not the receiving station exists in the network from which the message has been received is retrieved and judged. If the receiving station is judged to exist in the network from which the message has been received by the bridge circuit, a signal for stopping the receiving operation of the message is generated, thereby cancelling the receiving operation. If the means having the above-described structure is provided on each receiving means of the two networks so as to constitute a bridge circuit, the microprocessor in the bridge circuit need not execute the conventional table retrieval and has only to send the message normally received from one network to the other network.

The above and other related objects and features of the invention will be apparent from the following description of the disclosure in conjunction with the accompanying drawings and the novelty thereof is pointed out in the appended claims.

DESCRIPTION OF THE PREFERRED EMBODIMENT

An embodiment of the present invention will be explained hereinunder with reference to the accompanying drawings.

Figure 1:
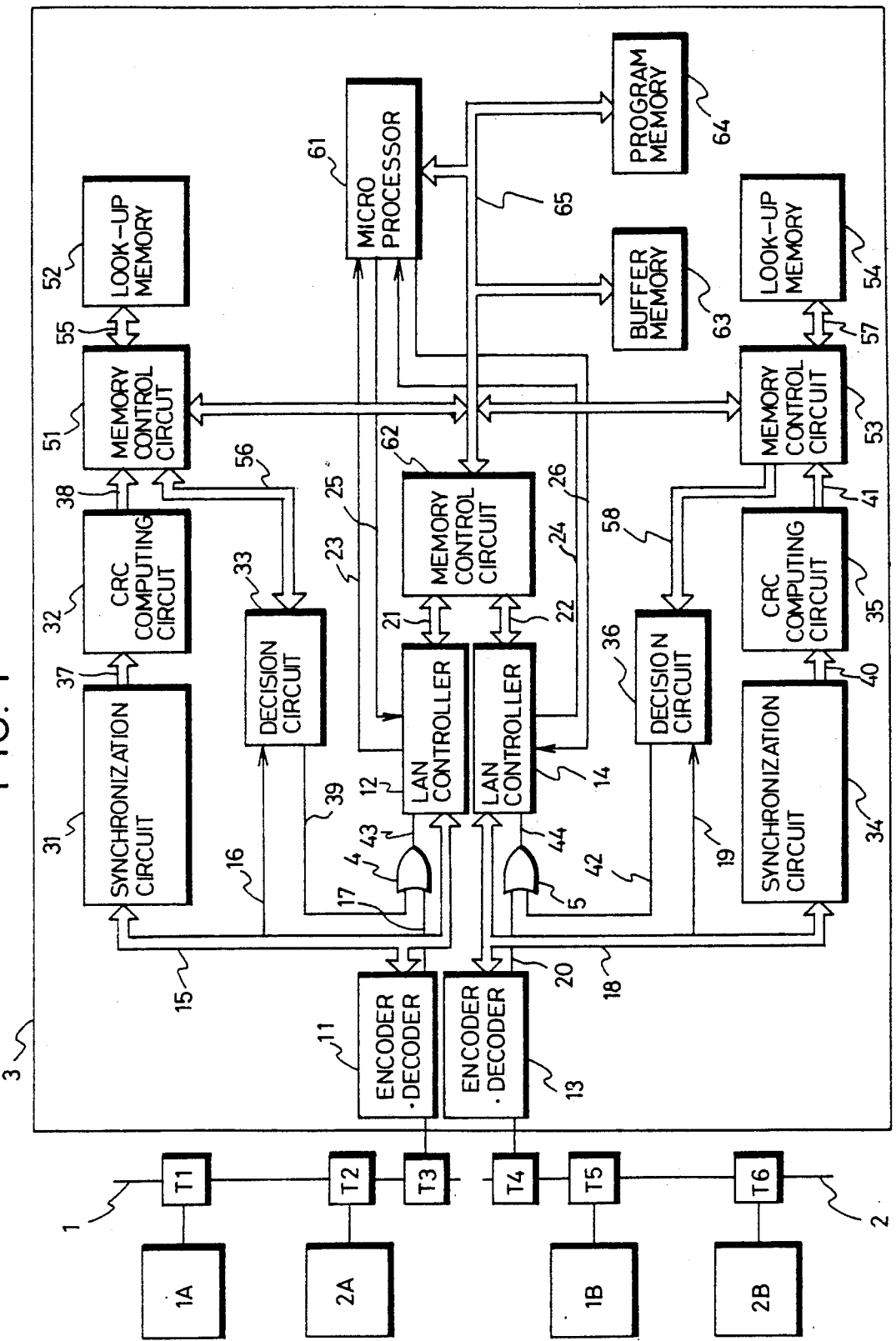
FIG. 1 is a basic block diagram of the system according to the present invention.

FIG. 1 shows an embodiment of the present invention in an Ethernet local area network. A first network has stations 1A and 2A which are connected to a segment 1 each through transceivers T1 and T2. A second network has stations 1B and 2B which are connected to a segment 2 each through transceivers T5 and T6. The first network and the second network are connected with each other by a bridge circuit 3 comprising identical first and second circuit means through transceivers T3 and T4. The number of stations connected to each network could be more than two. The first network is connected to an encoder-decoder 11 and the second network is connected to an encoder-decoder 13. The encoder-decoder 11 is connected to a LAN controller 12 and a synchronization circuit 31 through a bus 15. The encoder-decoder 13 is connected to a LAN controller 14 and a synchronization circuit 34 through a bus 18. As each of the encoder-decoders 11 and 13, for example, a device i82501 produced by INTEL and a device Am7992B produced by ADVANCED MICRO DEVICE (hereinunder referred to as "AMD") is usable. As each of the LAN controllers 12 and 14, a device i82586 produced by INTEL, for example, is usable. The LAN controller 12 is connected to a memory control circuit 62 through a bus 21. The memory control circuit 62 is connected to a buffer memory 63 through a bus 65. Similarly, the LAN controller 14 is connected to the memory control circuit 62 through a bus 22 in such a manner as to be accessible to the buffer memory 63 through the bus 65. Predetermined messages are transferred between each network by a microprocessor (hereinunder referred to as "MPU") 61 which controls the LAN controllers 12 and 14. For example, in the case of receiving a message from the first network, the MPU 61 supplies a channel attention signal for starting to the LAN controller 12 through a line 25 and when the LAN controller 12 has completed the reception of the message, the LAN controller 12 supplies an interrupt signal to the MPU 61 through a line 23. While the LAN controller 12 is receiving the message, the message is supplied to the buffer memory 63 through the memory control circuit 62. In the case of sending the message to the second network, the MPU 61 supplies a channel attention signal for starting to the LAN controller 14 through a line 26 and when the LAN controller 14 has completed the transmission of the message, the LAN controller 14 supplies an interrupt signal to the MPU 61 through a line 24. While the LAN controller 14 is sending the message to the second network, the LAN controller 14 receives the sending message from the buffer memory 63 the microprocessor 61, memory control circuit 62 and Lan controllers 12, 14 all comprising means for sending predetermined message signals to the respective local area networks.

In the Ethernet which uses a CSMA/CD method, collision detection signals are sensed by transceiver T3 or T4 during transferring a message. When the collision detection signals appear on line 17 or 20 during sending or receiving a message, the LAN controller 12 or 14 supplies an interrupt signal to the MPU 61 as a sending or receiving error, whereby the message sending or receiving operation is stopped.

The synchronization circuit 31 synchronizes with the source address and destination address in the message received from the encoder-decoder 11, and supplies the addresses to a computing means comprising a CRC computing circuit 32 or code generating means through a bus 37. The CRC computation circuit 32 is connected to comparing means which comprises a memory control circuit 51 and a look-up memory 52 through a bus 38, and supplies a request for accessing to the look-up memory or addressable means for storing source addresses 52 while using the results of the cyclic redundancy check of the addresses as a memory address. The memory control circuit 51 reads from and writes into the look-up memory 52 through a bus 55. The data or coded signals read from the look-up memory 52 are supplied to a decision circuit 33 through a bus 56, and the decision circuit 33 outputs a stop signal or a decision signal on a line 39 as the result of decision that the destination address is located in the first network. A logical OR gate 4 receives the stop signal through the line 39 and the collision detection signal through the line 17. The logical sum output from the OR gate 4 is input to the LAN controller 12 through a line 43. When the stop signal appears on the line 39 during sending a message, the LAN controller 12 supplies the interrupt signal to the MPU 61 because the destination address is located in the first network. Similarly, in a synchronization circuit 34, a CRC computing circuit 35, a memory control circuit 53 and a look-up memory 54 are connected to each other through buses 40, 41 and 57, respectively. The data read from the look-up memory 54 is supplied to a decision circuit 36 through a bus 58. The logical sum of the stop signal on a line 42 output from the decision circuit 36 and the collision detection signal on a line 20 is input to the LAN controller 14 through a line 44.

The total operation of this system will now be explained. The look-up memories 52 and 54 shown in FIG. 1 are initialized by the MPU 61. A method of initialization will be explained later with reference to FIGS. 5 and 6.

Figure 2:
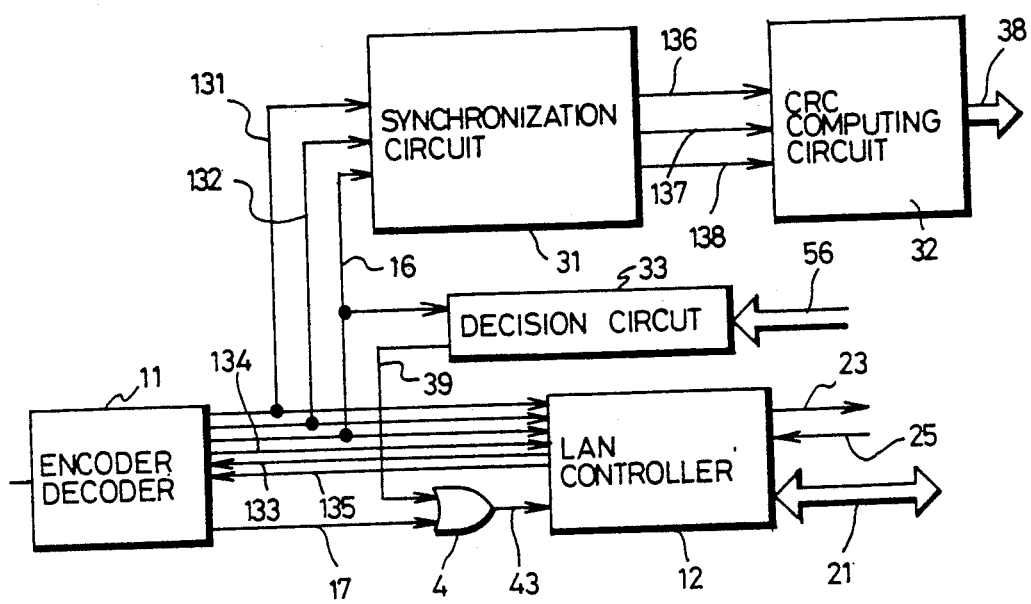
FIG. 2 is a block diagram showing the connection among an encoder-decoder, a synchronization circuit, a CRC computing circuit, decision circuit, and LAN controller shown in FIG. 1.
Figure 3:
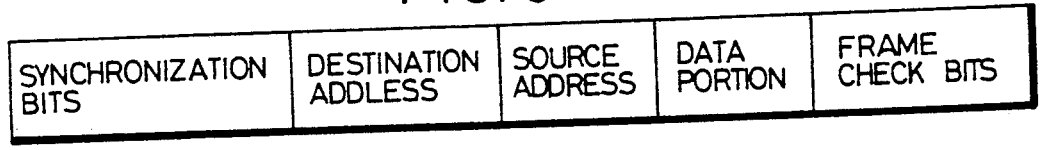
FIG. 3 shows the format of a message used in the system shown in FIG. 1.
Figure 4:
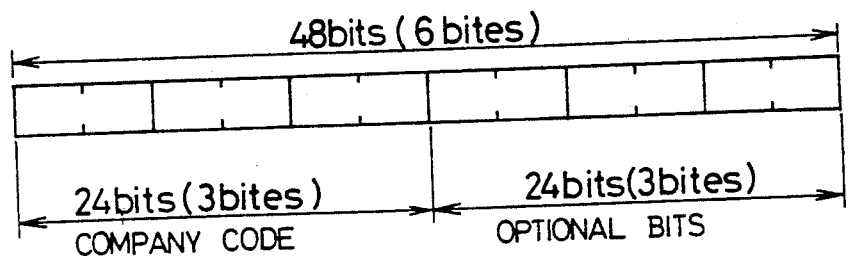
FIG. 4 shows an format of the address of a station in the message shown in FIG. 3.

The case of sending a message from the station 1A to the station 1B will first be explained as an example. FIG. 3 shows the format of a message used in the system shown in FIG. 1. The message has synchronization bits, a destination address, a source address, a data portion and frame check bits. FIG. 4 shows the format of the address of a station in the message shown in FIG. 3. The address has a company code having 24 bits, and optional bits having 24 bits. In FIG. 1, a message sent from the station 1A is sent to the segment 1 through a transceiver T1 and input to the encoder-decoder 11 through a transceiver T3. The encoder-decoder 11 decodes the encoded message, separates it into a receiving clock 131 and receiving data 132, as shown in FIG. 2, and supplies the receiving clock 131 and receiving data 132 to the LAN controller 12. The encoder-decoder 11 also supplies a carrier detection signal 16 and a collision detection signal 17 to the LAN controller 12. The LAN controller 12 receives the receiving data 132 in synchronization with the receiving clock 131 when the carrier detection signal 16 becomes effective, and transfers the message to the buffer memory 63, as described above. If the collision detection signal 17 does not appear during receiving the message or when an error is not detected in the reception of the message, the LAN controller 12 supplies an interrupt signal to the MPU 61 through the line 23 so as to indicate that the reception is normal. On the other hand, if the collision detection signal 17 appears or an error is detected in the reception of the message, the LAN controller 12 supplies an interrupt signal to the MPU 61 so as to indicate that the reception is abnormal. When the interrupt signal indicates the normal reception, the MPU 61 supplies a channel attention signal to the LAN controller 14 through the line 26 and starts the LAN controller 14 so as to supply the message from the station 1A which has been memorized in the buffer memory 63 to the segment 2. On the other hand, when the interrupt signal indicates the abnormal reception, the MPU 61 abandons the received message and does not supply it to the segment 2. The receiving clock 131, the receiving data 132 and the carrier detection signal 16 output from the encoder-decoder 11 are input to the synchronization circuit 31 and the carrier detection signal 16 is also input to the decision circuit 33, as shown in FIG. 2. When the carrier detection signal 16 appears, the synchronization circuit 31 samples the receiving data in synchronization with the receiving clock 131, and when the synchronization bits shown in FIG. 3 are detected, the synchronization circuit 31 supplies an arithmetic data 137 which is comprised of a destination address, source address, data portion and frame check bits, a sampling clock 136 and an operation enabling signal 138 to a CRC computing circuit 31. When the operation enabling signal 138 appears, the CRC computing circuit 32 computes the CRC operation of the arithmetic data 137 with respect to a predetermined bit length in synchronization with the sampling clock 136.

CRC will be explained briefly hereinunder. When CRC-16 bits is adopted, the CRC of a station address produces 64000 types of judgement. Therefore, if the address is more than 16 bits, the CRC values sometimes overlap each other. In case of the number of the stations existing in a network is about 1000, the number of the stations having a possibility of overlapping CRC values is 7.8 out of 1000, as represented by the following formula:

$$_{1000}C_2 \times 1/64000 \approx 7.8$$

The physical station address is 48 bits in accordance with the format IEEE802.3, as shown in FIGS. 3 and 4. Especially, to a product having this format, 3 bytes which is called a company code is allotted. It is therefore possible to reduce the overlapping degree by carrying out CRC for each region in a physical station address comprising company code, optional bit, and station address and by allotting different bits to the respective addresses.

The CRC computing circuit 32 computes the CRC operation of the destination address after the synchronization bits, and outputs a memory request signal to the memory control circuit 51 through the bus 38. The memory request signal has each result of the CRC operation on each region of the destination address shown in FIG. 5. The data bit in the look-up memory 52 is allotted in the same way as the memory request signal by the memory control Circuit 51. The memory control circuit 51 reads the bits from the look-up memory 52 with respect to the respective memory request signals computed by the CRC computing circuit 32, and inputs the read data to the decision circuit 33. The decision circuit 33 outputs the stop signal 39 if the all bits read from the look-up memory 52 with respect to the results of the CRC computation are set. This means that the destination address is located in the first network and the message from the first network is not transferred to the second network. The OR gate 4 outputs the logical sum of the stop signal 39 and the collision detection signal 17 output from the encoder-decoder 11 to the LAN controller 12 through a signal line 43. When the stop signal 39 is input to the LAN controller 12, the LAN controller 12 supplies an interrupt signal to the MPU 61 as an error in the reception of the message. If the look-up memory 52 is initialized and the address of the sending station is not stored in the look-up memory 52, the stop signal 39 is not produced, and the LAN controller 12 outputs an interrupt signal to the MPU 61 through the line 23 as the normal reception. The MPU 61 controls the LAN controller 14 to send the received message from the buffer memory 63 to the segment 2, thereby completing the process of sending the message from the station 1A to the station 1B.

The synchronization circuit 31 sends the source address subsequent to the destination address to the CRC computing circuit 32. The CRC computing circuit 32 computes the CRC of source address in the same way as in the case of destination address and outputs a memory request signal to the memory control circuit 51. In the case of the source address, the memory control circuit 51 sets each bit output from the CRC computing circuit 32 to the look-up memory 52 as the addresses. In this way, the station 1A which belongs to the segment 1 is stored in the look-up memory 52.

The case of sending a message from the station 2A to the station 1A will next be explained as an example. In this case, the bits which correspond to the results of the CRC computation of the destination address, i.e., address of receiving station 1A, have been set in the look-up memory 52 when the station 1A has been the sending station. All the bits read from the look-up memory 52 when the receiving station is the station 1A have already been set. Therefore, since the decision circuit 33 outputs the stop signal 39 to the OR gate 4, the OR gate 4 outputs the collision signal 43 to the LAN controller 12. The LAN controller 12 therefore regards the receiving message as an error and outputs an interrupt signal to the MPU 61 through the line 23, so that the MPU 61 controls the LAN controller 14 not to sent the message to the segment 2. The above-described bridge circuit is provided both in the segments 1 and 2, so that when a message is received from the segment 2, the addresses of the stations 1B and 2B which belong to the segment 2 are stored in the look-up memory 54 in the same way. In this way, according to the bridge circuit of the present invention, every when a message is received, the source addresses of the sending stations which belong to each segment are stored in the look-up memory 52, 54 respectively, and the transfer of the message between the segments is controlled from the destination address of the receiving station. When the results of the CRC computation of the stations, overlap with each other, a bit for the MPU 61 is allotted to the look-up memory, and the bit is read while using the result of CRC computation of either station as an address, this bit allotted for the MPU 61 is read so as to utilize this bit as the mask bit for the stop signals 39 and 42. In other words, while this bit is set, the generation of the stop signals 39 and 42 is nullified, and a message is transferred between the segments unconditionally.

Figure 5:
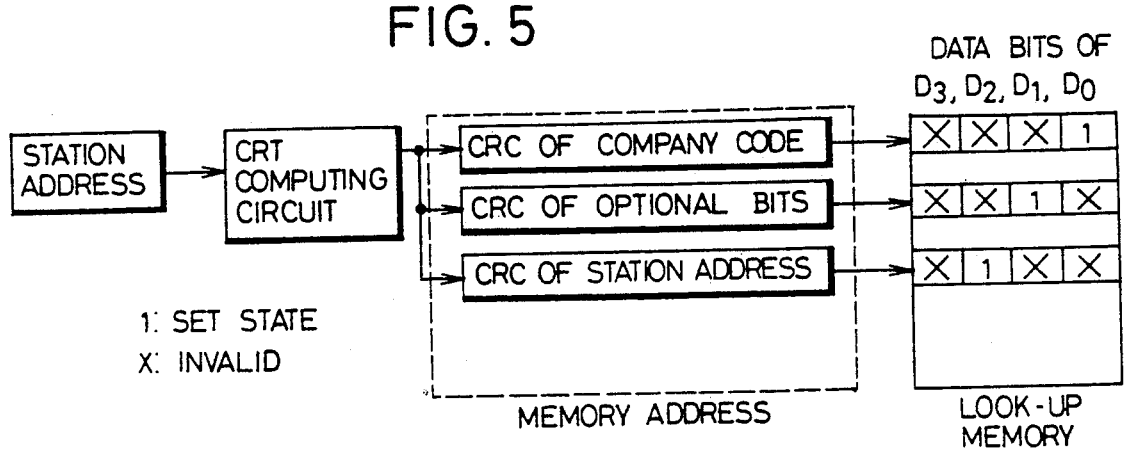
FIG. 5 shows the correspondence between the addresses obtained by the CRC computing circuit and data bits of a look-up memory.
Figure 6:
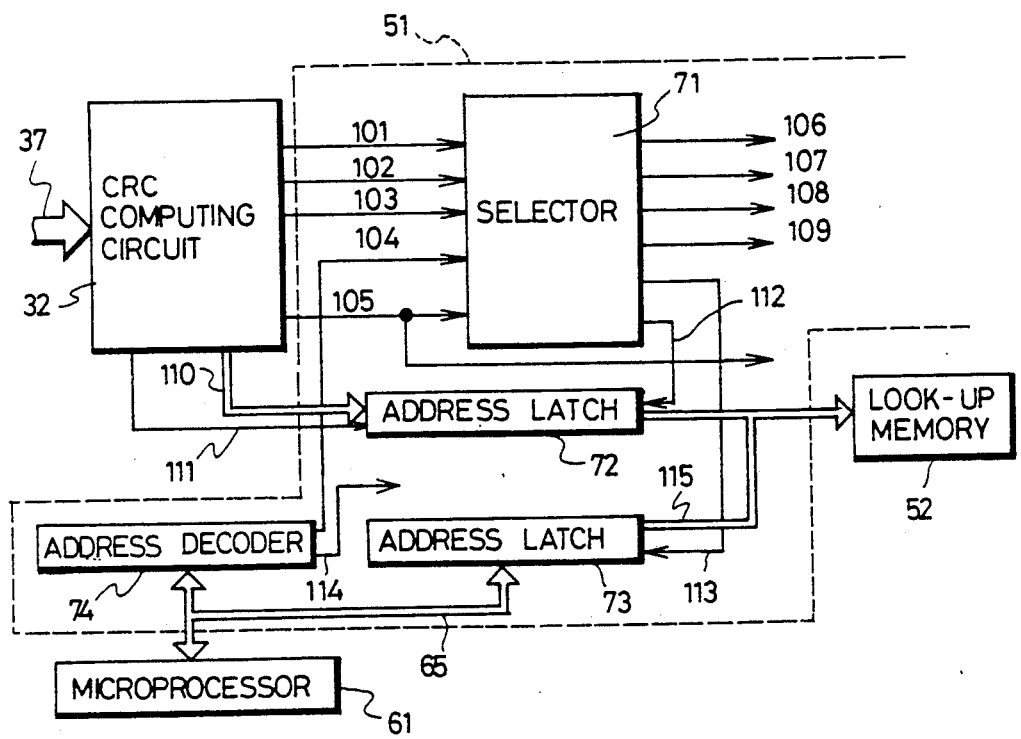
FIG. 6 and 7 are block diagrams of the memory control circuit controlling the look-up memory.
Figure 7:
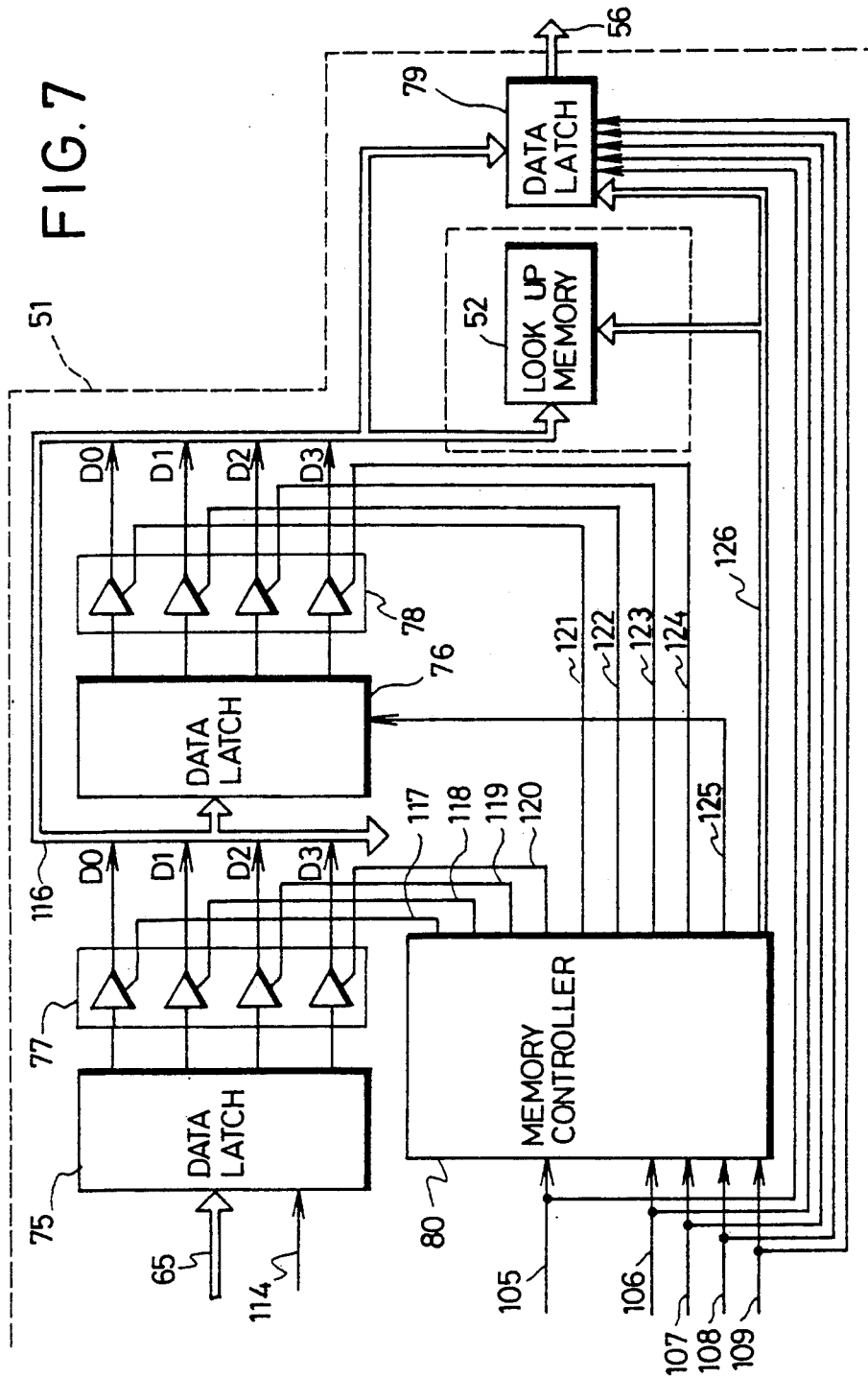

The control of the look-up memory 52 in the reception of a message from the segment 1 will now be explained with reference to FIGS. 6 and 7. FIGS. 6 and 7 are block diagram of the memory control circuit 51. As shown in FIG. 5, it is assumed that each company code, optional address and station address is subjected to CRC. As shown in FIG. 6, the results of the CRC executed in the CRC computation circuit 32 are output to a CRC data bus 110, and latched by an address latch 72 in accordance with a CRC data latch signal 111. When the results of the CRC are latched, a first request signal 101 to a third request signal 103 are subsequently output to a selector 71. The first to third request signals 101 to 103 correspond to the respective results of the CRC of the company code, optional bits and station address. The selector 71 outputs first to third select signals 106 to 108 in correspondence with the first to third request signals 101 to 103. Further, a fourth request signal 104 is output from the MPU 61 to the selector 71 through an address decoder 74. As the address of the look-up memory 52, the selector 71 makes a gate signal 112 effective and outputs a latch data of the address latch 72 in the case of the request from the CRC computing circuit 32, while in the case of the request from the MPU 61, the selector 71 makes a gate signal 113 effective and outputs a latch data of an address latch 73.

The look-up memory 52 is initialized by the MPU 61. The initialized data are written in a data latch 75 shown in FIG. 7 by the MPU 61. If the initialized data are the same over the entire area of the look-up memory 52, the initialized data are written in the data latch 75 only once. On the other hand, if the initialized data are different in the case of an address, the content of the data latch 75 is rewritten before the fourth request signal 104 is generated by the address.

When the MPU 61 outputs an address of the look-up memory, this address is latched in the address latch 73 through a bus line 65, and the address decoder 74 outputs the fourth request signal 104 to the selector 71. The selector 71 makes the gate signal 113 effectively, gives the address to the look-up memory 52, and further outputs a fourth select signal 109 to a memory controller 80 shown in FIG. 7. The memory cycle of the look-up memory 52 is composed of a read cycle and a write cycle as one cycle with respect to one request. In other words, with respect to a given address, the content of the look-up memory 52 is read, output to the data bus 116 from the look-up memory 52, and latched to the data latch 76 by the output of a read data latch signal 125, and the content of the data latch 75 is written in the look-up memory 52 at the subsequent write cycle. The write data of each bit is controlled by controlling enable signals 117 to 120 at a gate 77 and enable signals 121 to 124 at a gate 78. When a request is supplied from the MPU 61, all the enable signals 121 to 124 at the gate 78 are nullified, and all the enable signals 117 to 120 at the gate 77 are made effective, thereby writing the content of the data latch 75 in all bits of the look-up memory 52 and initializing the look-up memory 52. At this time, if it is known that there is an overlapping CRC value in the two segments, the bit allotted to the MPU 61 is set. When a message is received from the segment 1, the CRC of the company code of the destination address is computed and the result is latched in the address latch 72 and at the same time the first request signal 101 is input to the selector 71. The selector 71 makes the gate signal 112 effective to output an address to the address bus 115 and at the same makes the first select signal 106 effective. The memory controller 80 reads the content of the look-up memory, outputs it to the data bus 116 and latches it in the data latch 76. The bit allotted to the company code is simultaneously latched in a data latch 79. In this case, the enable signals 121 to 124 are made effective at the subsequent write cycle, and all bits write the content of the read data latched in the data latch 76 so as not to change the content of the look-up memory 52. Similarly, the bits of the optional bit and station address are read, and contents of the corresponding bits are latched to the data latch 79. The mask bit for the stop signal 39 output from the MPU 61 is latched in the data latch 79 while using the result of the CRC of the station address as the address. These latch data are input to the decision circuit 33 through the bus 56. When all the data are confirmed, the decision circuit 33 makes the stop signal 39 effective in the case where all the bits except the mask bit for the stop signal 39 which is allotted to the MPU 61 have been set, and processes the receiving message as the message producing collision, thereby making the reception of the message unsuccessful.

When the CRC computing circuit 32 starts the CRC computation of the source address, the CRC computing circuit 32 makes a switching signal 105 effective to inform the subsequent circuit that the object of the CRC is changed from the receiving station to the sending station. In the same way as in the case of the address of the receiving station, the CRC computing circuit 32 for computing the address from the company code subsequently generates the first to third request signals to the selector 71, and the selector 71 generates the first to third select signals 106 to 108 to the memory controller 80 in correspondence with the request signals. The write cycle of the look-up memory 52 in the case of the source address is different from that in the case of the destination address. That is, with respect to the bit which corresponds to each request signal, the content of the data latch 75 is written and with respect to the other bits, the content of the data latch 76 is written, whereby the content of the bit in the look-up memory 52 is held.

When the first select signal 106 of the company code is effective, the enable signal 117 alone is made effective to the gate 77 and the enable signals 122 to 124 are made effective to the gate 78, and the D0 bit which corresponds to the company code alone is set in the write cycle. Similarly, with respect to other requests, allotted bits alone are set so as to store the addresses of the sending stations which belong to the segment 1 in the look-up memory 52. In the case of the source address, the switching signal 105 is made effective so as not to latch the bit at the read cycle of the look-up memory 52.

Figure 10:
FIG. 10 shows the format of a message used in the Fiber Distributed Data Interface.

The second embodiment of the present invention will illustrate an embodiment in an FDDI (Fiber Distributed Data Interface) which is an optical fiber, local area network having a processing capacity of 100 mega-bits per second stipulated by ANSI. In the same way as in the Ethernet shown in FIG. 1, the message format of FDDI has the data of the address of the sending station and the address of the receiving station in the message, as shown in FIG. 10.

Figure 8:
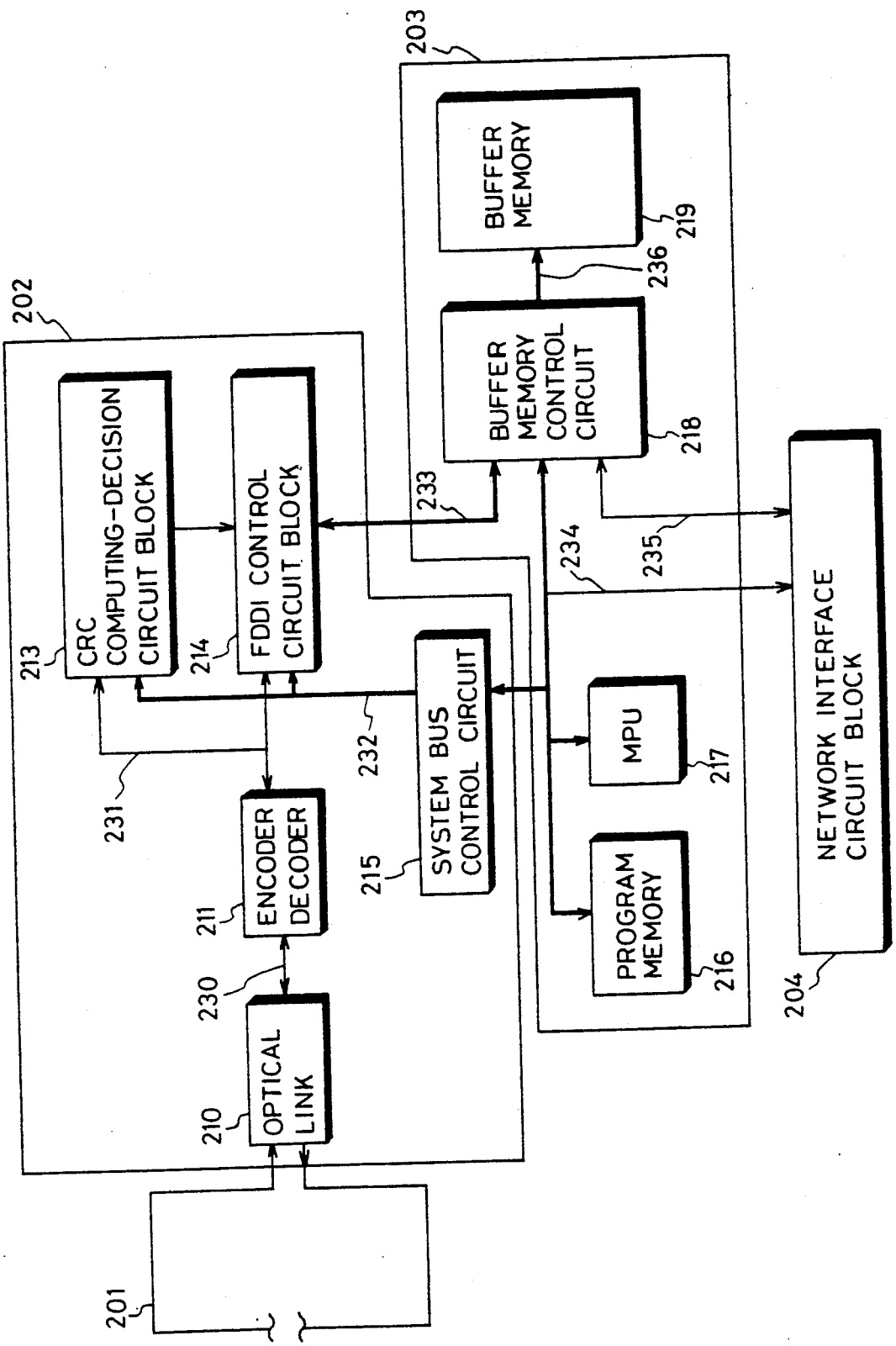
FIG. 8 is a system block diagram in another embodiment of the present invention.

FIG. 8 shows a system block diagram in accordance with the present invention. This system block diagram broadly consists of three circuit blocks. A network interface circuit block 202 is disposed between an optical network 201 of FDDI and a system control block 203. This block consists of an optical link 210 for converting an optical signal of the optical network 201 of an FDDI to an electric signal; and encoder-decoder 211 for encoding and decoding data; an FDDI control circuit block 214 for controlling a physical layer level of an FDDI; and an CRC computing-decision circuit block 213 for performing the CRC computation of the address of the sending station in the reception message in accordance with the present invention to store it as the address information and performing the CRC computation of the address of the receiving station in the reception message to compare it with the sending station address information stored and generate a decision signal 239.

A network interface circuit block 204 is a circuit block which establishes the interface between the optical local area network 201 of FDDI and the counterpart network and can be constituted in such a manner as to connect mutually two FDDIs by use of the similar circuit to the network interface circuit block 202 or to connect mutually FDDI and the Ethernet by use of the circuit shown in FIG. 1.

The system control block 203 consists of MPU 217 for initializing the network interface 1 circuit block 202 and the network interface circuit block 204 and controlling the transmission/reception operation between the networks, a program memory 216 for operating MPU 217, a buffer memory 219 for the transmission/reception data, and a buffer memory control circuit 218.

Figure 9:
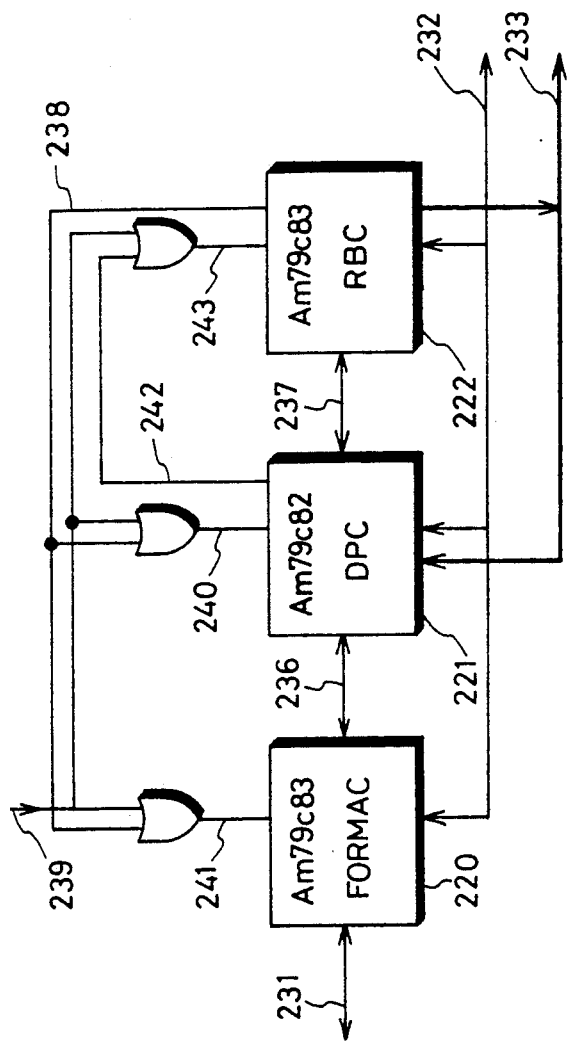
FIG. 9 is a block diagram of a Fiber Distributed Data Interface control circuit.

In FIG. 8, it is possible to employ the circuit system shown in FIG. 1 as the CRC computing-decision circuit block 213 as a circuit system which receives the receiving data and receiving clock from the encoder-decoder 211 and outputs a decision signal. Accordingly, this circuit block 213 will be hereby defined as the circuit block which executes the CRC computation of the source address from the receiving data and the memory retrieval of the source address information and the comparison and decision of the source address information on the basis of the computation result as the source address information and outputs the decision signal 239 as the result. The internal structure of this circuit block 213 will not be described. As shown in FIG. 9, an LSI chip set produced by AMD can be used as the FDDI control circuit block 214. As is well known in the art this LSI chip set includes an Am79c83 optical link access controller 220 (hereinafter referred to as "FORMAC") for performing message management of the FDDI physical layer level and exchanging only the data relating to nodes with a chip in the next stage, an Am79c8.2 data path controller 221 (hereinafter referred to as "DPC") of a 2-chip structure for arbitrating the data transmission/reception requests between MPU 217 and FORMAC 220 to transfer data between FORMAC 220 and the buffer memory 219, and an Am79c81 RAM buffer controller 222 (hereinafter referred to as "RBC"). Next, the connection relation between these three chips, MPU 217 and the buffer memory 219 will be explained with reference to FIGS. 8 and 9.

FORMAC 220 DPC 221 and RBC 222 are connected with one another by exclusive control signal buses 236 and 237, respectively, and these three chips and MPU 217 are connected to one another through a system bus 232. MPU 217 is connected to the system bus 232 from an MPU bus 234 through the system bus control circuit 215 so that it can initialize these three chips and control their transmission/reception operations by use of the system bus 232. DPC 221 and RBC 222 have a buffer memory bus 233 for making access to the buffer memory 219 and this buffer memory bus 233 is connected to the buffer memory 219 through the buffer memory control circuit 218 and the memory bus 236.

The receiving message from the FDDI optical loop local area network is converted from an optical signal to an electric signal by the optical link 210 and inputted to the encoder-decoder 211 through the bus 230. The encoder-decoder 211 separates the data and the clock from the encoded receiving message and outputs these signals together with a signal representing the reception state to the FDDI control circuit block 214 and the CRC computing-decision circuit block 213 through the bus 231. Besides the signals described above, the bus 231 contains the data and clock relating to the transmission and the control signal.

When the receiving data becomes effective, the CRC computing-decision circuit block makes the CRC computation of the address of the receiving station in synchronism with the preamble, start delimiter and frame control field that are shown in FIG. 10, as illustrated in FIG. 1, compares the result with the stored address information of the sending station to determine the state of the decision signal 239, makes the CRC computation of the subsequent source address, and stores the source address information.

Of the receiving message inputted to FORMAC 220, the data relating to the management of the physical layer is processed inside FORMAC 220 and only the data to be delivered to MPU 217 is transferred to DPC 221 of the post-stage.

When the transfer request from FORMAC 220 to DPC 221 becomes effective and when RBC 222 receives the transfer request from DPC 221, RBC 222 generates the memory access request to the buffer memory control circuit 218 through the buffer memory bus 233 and transfers the receiving data to the buffer memory 219. When the transfer of the receiving data is complete, DPC 221 notifies the data end to RBC 222 by making effective the CVFRM signal 242 representing the end of the data. When the transfer of the receiving data to the buffer memory 219 is complete, RBC 222 simultaneously prepares the information such as the data length, address, receiving status, etc., of the receiving data as the management table for the buffer memory 219 and notifies the interrupt to MPU 217 through the system bus 233. Receiving this interrupt, MPU 217 makes access to the management table and when it confirms normal reception, it notifies this receiving data as the sending data to the network interface circuit block 204 and lets it send it to the counter-part network. If the buffer memory 219 is out of space for receiving data, RBC 222 activates an RBFERR signal 238 representing that no empty area exists in the receiving, buffer and sends this signal to DPC 221 and to FORMAC 220 to interrupt their reception processing. Also, it interrupt the reception processing by notifying MPU 217 of the receiving data length $\phi$.

In the present invention the logical sum is calculated between the decision signal 239 and the RBFERR signal 238 and inputted to DPC 221 and to FORMAC 220. When the receiving station address is in agreement with the source address of the FDDI optical loop local area network 7201, the decision signal 219 is made effective so that the RBFERR input signal 240 and the RCVABTI signal input 241 to DPC 221 and FORMAC 220 are made effective and the receiving operation is completed compulsively. Furthermore, the logical sum is calculated also between the decision signal 239 and the ERCVFRM signal 242 representing the end of reception of DPC 221 and inputted to the ERCVFRM input signal 243 of RBC 222. Accordingly, when the decision signal 239 becomes effective, MPU 217 completing the transfer of the corresponding receiving data refers to the management table of the receiving data due to the interrupt of RBC 222 but in this case, since the receiving data length does not represent the normal length inclusive of the information frame, the receiving frame described above is discarded.

If the destination address is in agreement with the source address as described above, the receiving operation of the corresponding data is compulsively finished by making effective the decision signal 239, thereby accomplishing the present invention.

As described above, according to the present invention, every time a message is received by the bridge circuit, results of the CRC operation of source address is stored in the memory, whereby it is possible to judge whether or not a message is abandoned substantially simultaneously with the reception of the destination address of the message. Furthermore, since a microprocessor dispenses with the conventional processings such as the storing of the source address and the retrieval, comparison and judgement of the destination address, the processing of the microprocessor is simplified, thereby achieving the improvement of the transferring speed between the networks. This function is especially effective, for example, when the physical transferring speed of a network is increased to a much greater extent than the processing speed of a microprocessor.

What is claimed is:

1. A bridge circuit for interconnecting at least first and second local area networks each having a plurality of stations and each of which stations is formed to send or receive a message signal, the message signal including an address signal of a destination station and an address signal of a source station, said bridge circuit comprising:
    (a) first circuit means coupled with said first and second local area networks for receiving said message signal to from said source station and sending said message signal to said destination station;
    (b) second circuit means coupled with said first and second local area networks for carrying out a cyclic redundancy check of said address signal of said destination station and said address signal of said source station included in said received message signal;
    (c) first memory means for storing an address information of said source station included in said received message signal;
    (d) memory control means coupled with said second circuit means and said first memory means for controlling said first memory means using results obtained by said second circuit means in carrying out said cyclic redundancy check;
    (e) decision means coupled with said memory control means and said first circuit means for judging whether the reception of said message signal is stopped or not in accordance with the address information read from said first memory means and outputting a stop signal to said first circuit means when the decision means judges that the reception of said message signal is stopped;
    (f) second memory means coupled with said first circuit means for storing the received message signal; and
    (g) microprocessor means coupled with said first circuit means and said memory control means for controlling the first circuit means to receive or transmit said message signal.

2. A bridge circuit according to claim 1; wherein said second circuit means carries out said cyclic redundancy check for every region having a variable bit-length allotted to said addresses of said source station and said destination station included in said received message signal.

3. A bridge circuit according to claim 1; wherein said memory control means writes address information in said first memory means according to an address of said first memory means and address information produced by said microprocessor means.

4. A bridge circuit according to claim 1; wherein said first memory means is so composed as to write address information while using said result of said cyclic redundancy check of said address of said source station included in said received message signal as the address of said first memory means, and to read an address information while using said results of said cyclic redundancy check of said address of said destination station included in said received message signal as to the address of said first memory means.

5. A bridge circuit for interconnecting at least a first and a second local area network each comprising a plurality of stations, each station being capable of sending and receiving message signals, each message signal including an address of a destination station and an address of a source station, the bridge circuit comprising:
    first circuit means for receiving first message signals from the first local area network, each first message signal being comprised of a source address representative of a source station and a destination address representative of a destination station, and for receiving predetermined ones of second message signals whose destination addresses correspond to a station in the first local area network and sending the predetermined second message signals to the first local area network, and for producing decision message signals denoting predetermined ones of the first message signals whose destination addresses correspond to a station in the second local area network and which are to be sent to the second local area network, the first circuit means comprising first computing means for computing first coded signals from the first message signals, and first decision generating means for generating the first decision signals from the first coded signals, the first decision signals being used to control the sending of the predetermined first message signals to the second local area network;
    second circuit means for receiving second message signals from the second local area network, each second message signal being comprised of a source address representative of a source station and a destination address representative of a destination station, and for receiving the predetermined first message signal from the first circuit means and sending the same to the second local area network, and for producing second decision signals denoting the predetermined second message signals which are to be sent to the first circuit means; and
    means responsive to the first and second decision signals for sending the predetermined first message signals and predetermined second message signals to the respective second and first local area networks.

6. A circuit according to claim 5; further comprising message storing means for storing the first and second message signals and coacting with the means for sending to enable stored predetermined first and second message signals to be sent to the respective second and first local area network.

7. A circuit according to claim 5; wherein the first computing means includes first code generating means for generating first source coded signals and first destination coded signals, the first source coded signals and the first destination coded signals being derived from the source and destination addresses of the first message signals.

8. A circuit according to claim 7; wherein the first computing means includes first means for comparing the first source coded signals with the first destination coded signals to determine if the destination stations are located within the first local area network and for outputting the results as the first coded signals.

9. A circuit according to claim 8; wherein the first means for comparing includes first addressable means for storing the source addresses of the first message signals at addresses determined by the first source coded signals.

10. A circuit according to claim 5; wherein the first computing means includes means for computing first cyclic redundancy check coded signals from the first message signals.

11. A circuit according to claim 6; wherein the second circuit means comprises second computing means for computing second coded signals from the second message signals, and second decision generating means for generating the second decision signals from the second coded signals, the second decision signals being used to control the sending of the stored, predetermined second message signals to the first circuit means from the message storing means.

12. A circuit according to claim 11; wherein the second computing means includes second code generating means for generating second source coded signals and second destination coded signals, the second source coded signals and the second destination coded signals being derived from the source and destination addresses of the second message signals.

13. A circuit according to claim 12; wherein the second computing means includes second means for comparing the second source coded signals with the second destination coded signals to determine if the destination stations are located within the second local area network and for outputting the results as the second coded signals.

14. A circuit according to claim 13; wherein the second means for comparing includes second addressable means for storing the source addresses of the second message signals at addresses determined by the second source coded signals.

15. A circuit according to claim 11; wherein the second computing means includes means for computing second cyclic redundancy check coded signals from the second message signals.

16. A circuit according to claim 5; further comprising first converting means for converting first optical message signals into the first message signals and comprising second converting means for converting second optical message signals into the second message signals.

17. A circuit according to claim 5 further comprising first and second circuit means for receiving first and second fiber distributed data interface message signals.

* * * * *